US012117904B1

(12) United States Patent
Gupta et al.

(10) Patent No.: US 12,117,904 B1
(45) Date of Patent: Oct. 15, 2024

(54) PROGRAMATIC CHANGELOG-BASED REPLICATION OF FILE SYSTEM CHANGES TO TARGET STORAGE SYSTEM

(71) Applicant: Amazon Technologies, Inc., Seattle, WA (US)

(72) Inventors: Tarang Gupta, Salem, MA (US); Chunhui Zhang, Lexington, MA (US); Joel Richard Normandin, Littleton, MA (US); Alfonso Neal Merkl, Boston, MA (US); Huaqing Wang, Brookline, MA (US); Michael Nishimoto, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 163 days.

(21) Appl. No.: 17/456,550

(22) Filed: Nov. 24, 2021

(51) Int. Cl.
*G06F 16/00* (2019.01)
*G06F 11/14* (2006.01)
*G06F 16/18* (2019.01)

(52) U.S. Cl.
CPC ...... *G06F 11/1448* (2013.01); *G06F 16/1805* (2019.01)

(58) Field of Classification Search
CPC .................. G06F 11/1448; G06F 16/1805
See application file for complete search history.

(56) References Cited

U.S. PATENT DOCUMENTS

| 10,043,026 | B1* | 8/2018 | Salour | G06F 16/2365 |
| 2011/0295806 | A1* | 12/2011 | Erofeev | G06F 11/2094 707/634 |
| 2014/0279892 | A1* | 9/2014 | Bourbonnais | G06F 16/278 707/633 |
| 2015/0066850 | A1* | 3/2015 | Oliver | G06F 12/02 707/620 |
| 2022/0129353 | A1* | 4/2022 | Bhagi | G06F 11/2094 |

* cited by examiner

*Primary Examiner* — Alex Gofman
*Assistant Examiner* — Suman Rajaputra
(74) *Attorney, Agent, or Firm* — Knobbe, Martens, Olson & Bear, LLP (57) ABSTRACT

Systems and methods are provided for conducting continuous changelog-based replication of modifications made to a file system to a target storage system. An export system can monitor a changelog on a file system to detect changes made to the file system. The exporter system can further filter and reformat the changes for replication to the target storage system by storing the changes in a pending changes data store. To reduce duplicative traffic, the export system can store changes for a configurable delay period, writing all pending changes to a file system object after the delay while aggregating and deduplicating the changes, thus improving performance relative to immediate replication.

20 Claims, 5 Drawing Sheets

PROGRAMATIC CHANGELOG-BASED REPLICATION OF FILE SYSTEM CHANGES TO TARGET STORAGE SYSTEM

BACKGROUND

Computing devices typically store data within a file system, which represents a data structure by which an operating system stores data (and corresponding mechanisms for interacting with the file system to store and retrieve data). A wide variety of file systems exist. Some file systems operate on local storage devices, represented for example by physical storage media connected to a local bus of a computing device or virtualized local storage devices provided by a cloud-based block storage system. Network file systems, sometimes referred to as distributed file systems, enable a computing device to access non-local storage via a network protocol. Operating systems typically provide for a variety of operations common across different file systems, such as mounting and unmounting a file system, listing directories, reading and writing particular locations within a file (e.g., at specific blocks), and implementing file permissions.

A common concern with file systems and data storage in general is resilience to failure or error, due for example to software failure, hardware failure, operator error, or a combination thereof. A wide variety of mechanisms exist to address and mitigate such failures or errors. For example, RAID ("Redundant Array or Inexpensive Disks") technology can enable a data storage system to recover from one or more hardware failures. Data backup technologies, such as disk image snapshots, can facilitate archival storage to enable recovery of data in case of software failures or operator errors. These mechanisms are often employed for single device file systems with a relatively small amount of storage (e.g., on the order of terabytes). However, these mechanisms are more difficult to implement within larger storage systems, such as distributed storage systems, which may facilitate storage that is orders of magnitude larger than single device file systems (e.g., on the order of petabytes or exabytes of data).

DETAILED DESCRIPTION

Generally described, aspects of the present disclosure relate to programmatic replication of file system changes to a target network storage system. More specifically, embodiments of the present disclosure can be utilized to monitor a changelog of a distributed file system, such as the LUSTRE™ file system, and to prune, deduplicate, and format such changes before replicating the changes to one or more corresponding target network storage systems, such as one or more cloud-based object data stores. As disclosed herein, programmatic replication of changes via a file system changelog can address drawbacks present in other possible replication techniques, such as periodic scanning of a file system. For example, programmatic replication of changes via a file system change log can enable propagation of file system operations such as file renames and deletions without requiring a comparison between the file system and the target network storage system. Moreover, embodiments of the present disclosure can minimize redundant network traffic by providing for deduplication between changes prior to replicating the changes to the target network storage system. For example, rather than propagating each change to a target storage system immediately, embodiments of the present disclosure may provide for batching of changes to a given file occurring over a threshold time period (e.g., 1 hour). As disclosed herein, such a batch of changes may be pre-processed after the threshold time period to facilitate deduplication, such as by removing changes that are invalid in view of later changes. The batch of changes may then be propagated to the target network storage system, facilitating replication of data within the file system to the network storage system. This replication, in turn, enables increased resiliency and accessibility of data within the file system.

When seeking to duplicate file system changes to a remote location, one possibility is to periodically replicate the file system. For example, periodic object-based snapshots of the file system, reflecting an entirety of the data within the file system, may be created and stored in a remote location such as cloud-based object storage. While this approach may be possible with smaller file systems, it may lead to excessive computing resource usage for larger file systems, such as distributed file systems, which may store data on the order of petabytes or exabytes. For example, the process of creating an object-based snapshot may take excessive time, and require excessive network bandwidth to transfer to destination storage. Another mechanism to periodically replicate a file system is to use a periodic process to scan a file system, export each file (or other file system object, such as hard links, symbolic links, directories, etc.) to the target network storage system, and maintain data indicating that each file (or other object) has been exported. On a next periodic execution, the process may scan for files (or objects) changed since the prior export (e.g., with a "modified" time subsequent to a last execution), and export those changed files (or objects) to the target network storage system. While at least partially effective, this technique has drawbacks and limitations. For example, this technique may be relatively time consuming and resource intensive, thus inhibiting operation of a file system during execution. Moreover, this technique may be unable to detect deleted files or objects without conducting a comparison to the target network storage system, which comparison further increases time consumption and resource usage of the process.

Embodiments of the present disclosure address these drawbacks and limitations by providing for changes made to a file system to be continuously replicated to a target network storage system. As disclosed herein, a file system may maintain a changelog indicating changes made to that file system, such as creating a file, writing to a file, renaming a file, moving a file, etc. (While example embodiments are described herein within reference to files, it should be understood that these embodiments may also apply to any file system object, including files, hard links, symbolic links, directories, and the like.) An exporter system can monitor this changelog to detect such changes, and export the changed file to a target network storage system. For example, a changelog may indicate that a file "foo.txt" has been modified. The exporter system may detect this change within the changelog, and in response, replicate the file "foo.txt" to a target network storage system.

To provide for increased performance and customization, the exporter system may prune changes prior to exportation. For example, an operator of a file system may configure the export system to link specific portions of the file system (e.g., specific directories, including potentially the root directory) with specific target network storage systems, such that changes to each directory are exported to a corresponding target network storage system. Moreover, the operator may configure the export system with parameters indicating types of changes to be exported. Illustratively, for each directory, an operator may specify a policy indicating that the export system should export newly created files, deleted files, changed files, or a combination thereof. On execution, the exporter system may filter (or "prune") changelog entries to detect only changes matching the specified policy for a given directory.

In addition, the exporter system may format changes as appropriate for the target network storage system, such as in instances where a file system format of the instance file system and the target network storage system differ. As an example, in some cases a target network storage system may not directly support directories, and instead provide a flat file system hierarchy. To provide for directory-like functionality, the target network storage system may enable the use of characters in object names that denote pseudo-directories. For example, a file "bar.txt" in the directory "foo" of a file system may, in that file system, be represented as "/foo/bar.txt." On a target network storage system supporting pseudo-directories, the file may be stored as an object named "/foo/bar.txt." The target network storage system may provide for functionality to interact with objects in a directory-like manner, such as by providing a "list" command that accepts a prefix (e.g., "/foo/") and returns a list of objects with that matching prefix. In such cases, it may not be possible to directly export changed objects from a file system to the target network storage system. Illustratively, because the target network storage system (in this example) does not support directories, it may not be possible to directly replicate changes such as creating, renaming, or deleting directories. To facilitate replication between a file system and such a target network storage system, an exporter system as disclosed herein can format changes as appropriate between the two systems. For example, the exporter system may translate a command to create a directory on a file system to multiple commands on a target network storage system to create network objects using a prefix matching the name of the directory. Similarly, the exporter system may translate commands on a file system to rename or delete a directory to multiple commands on a target network storage system to rename or delete network objects with a prefix matching the name of the directory.

In some instances, an exporter system may replicate changes immediately (e.g., without imposing a delay). However, in other instances, a delay may be beneficial. For example, in some cases an exporter system may be configured to export changes at granularity of individual files (rather than, for example, replicating only the changes made to the file). This may be due, for example, to a changelog indicating that a file has been changed, but not indicating the particular change that was made. Additionally or alternatively, this may be due to a target network storage system not supporting partial file modifications (e.g., direct editing of a file address range, as opposed to storing a new version of the file). In such instances, immediate replication of changes may result in unnecessary and undesirable network traffic. As an illustration, consider an instance in which a program accesses a relatively large file (e.g., on the order of gigabytes) and, over the course of minutes or hours, makes a variety of small changes to that file. Each change may be recorded to a changelog of the file system, and thus might, in the case of immediate replication, result in an exportation of that relatively large file to a target network storage system. As a result, the same relatively large file may be transferred over a network multiple times, with an initial transfer potentially not completing before a next transfer begins (and potentially obviating a need for the initial transfer). This duplication of transfer may result in undesirable and unnecessarily excessive resource use.

To address the above-noted problem, embodiments of the present disclosure can provide for a delay in replicating changed files. For example, each change to a file detected within a changelog may initiate, on an export system, a timer of a pre-determined duration (e.g., 1 hour). At the conclusion of the timer, the export system may replicate the file, as changed, to a target network system. By replicating after a delay, changes to file system objects can be effectively deduplicated. For example, multiple changes to a file may be replicated by transferring the file, as it exists on the file system after those multiple changes, via a single transfer operation. Similarly, where a later change invalidates an earlier change, such as where a file is deleted after being created or modified within a given timespan, the earlier change may be disregarded by the export system. Accordingly, delayed replication may significantly improve performance relative to immediate replication.

As will be appreciated in view of the above description, the embodiments described herein relate to replication of changes made to a file system to target network storage, as opposed for example to direct use of network storage as a file system. Various techniques exist to directly use network storage as a file system. For example, a network storage system may provide for access via the network file system, or "NFS" protocol, thus enabling a remote client device to mount, write to, and read from the network storage system. The techniques described herein are distinct from such direct use, at least because the techniques described herein relate to replication from a file system (which may be a local file system, a network file system, etc.) to another storage system (e.g., another file system, cloud-based object storage, etc.). Accordingly, embodiments described herein can monitor for changes actually made to the source file system (e.g., edits to files that have actually occurred on the file system), and replicate (i.e., reproduce or duplicate) those changes to a target network storage system, thus providing for example increase resiliency and accessibility for the data of the source file system.

As will be appreciated by one of skill in the art in light of the present disclosure, the embodiments disclosed herein improve the ability of computing systems, such as network file systems and particularly large distributed file systems, to replicate changes made to file system objects to a network storage system. Moreover, the presently disclosed embodiments address technical problems inherent within computing systems; specifically, the limited nature of computing resources that are required to transfer data in connection with file system change replication. These technical problems are addressed by the various technical solutions described herein, including the use of delayed changelog-based replication to facilitate continuous, deduplicated and pruned change replication. Thus, the present disclosure represents an improvement in file systems and computing systems in general.

The foregoing aspects and many of the attendant advantages of this disclosure will become more readily appreciated as the same become better understood by reference to the following description, when taken in conjunction with the accompanying drawings.

Figure 1:
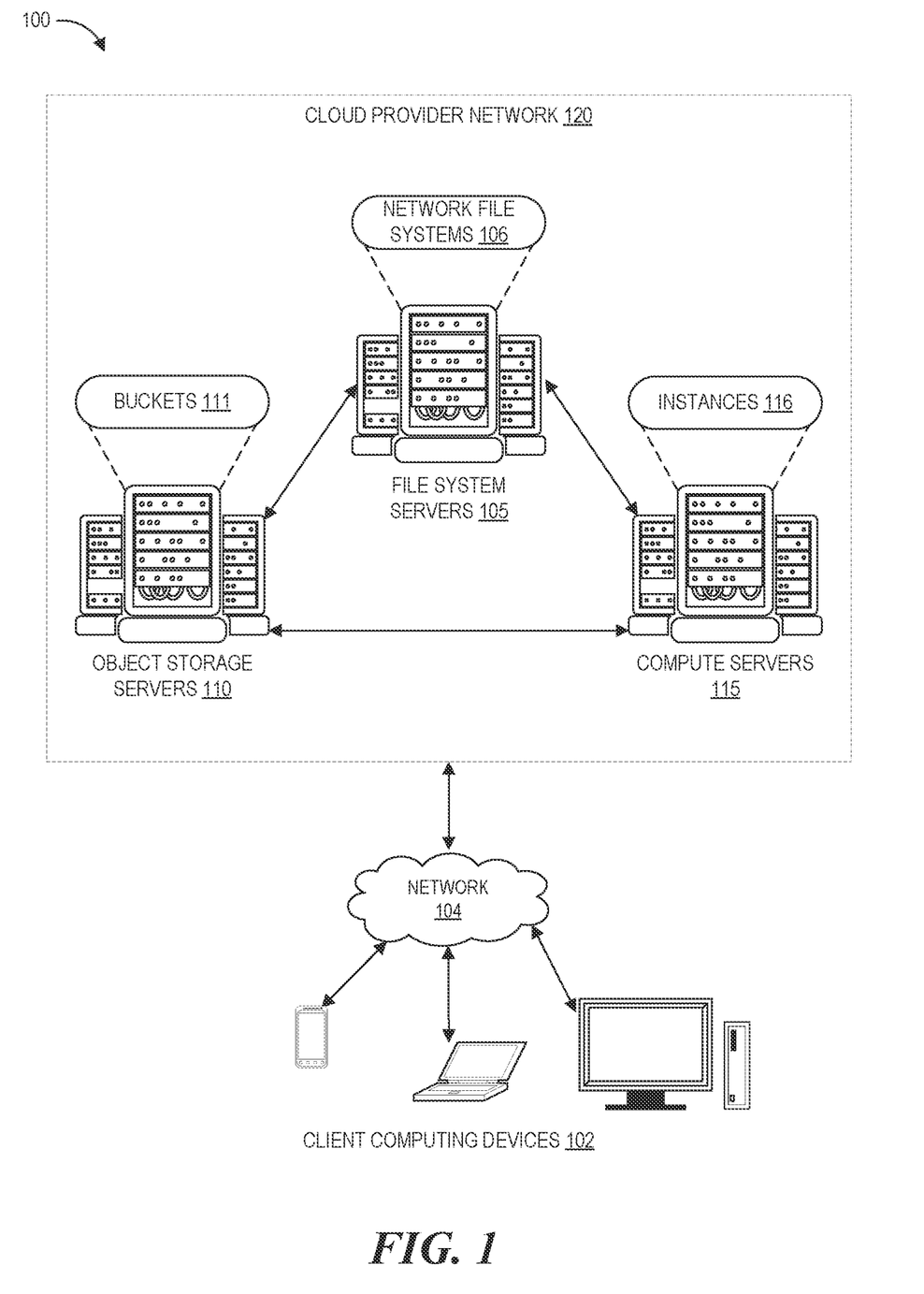
FIG. 1 depicts a schematic diagram of a cloud provider network in which various embodiments according to the present disclosure can be implemented.

FIG. 1 depicts an example computing environment 100 including a cloud provider network 120 in which embodiments of the present disclosure can be implemented. The cloud provider network 120 can be accessed by client computing devices 102 over a network 104. A cloud provider network 120 (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 120 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In FIG. 1, the cloud provider network 120 includes one or more file system servers 105, one or more object storage servers 110, and one or more compute servers 115 that are in networked communication with one another and with the network 104 to provide users with on-demand access to computing resources including network file systems 106, buckets 111, and instances 116, among others. These particular resources are described in further detail below. Some implementations of cloud provider network 120 can additionally include domain name services ("DNS") servers, relational database servers, servers providing serverless computing services, servers providing cloud-based block storage volumes, and other server services (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can provide on-demand, scalable computing platforms to users through the network 104, for example allowing users to have at their disposal scalable "virtual computing devices" via compute servers 115. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 120 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural (or other) disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Turning specifically to the roles of the different servers within the cloud provider network 120, the compute servers 115 include one or more servers which provide resizable computing capacity to users for building and hosting their software systems. The compute servers 115 and associated control plane functionality can provide an elastic compute cloud service of the cloud provider network. Compute services can be referred to as a virtual compute service, or cloud compute service, in various implementations. Users can use the compute servers 115 to launch as many virtual computing environments, referred to as virtual compute instances, virtual machine instances, virtual machines, or "instances" 116, as they need. Instances 116 can have various configurations of processing power, memory, storage, and networking capacity depending upon user needs.

The file system servers 105 provide for access, by the instances 116 for example, to one or more network-accessible file systems 106. The network file systems 106 may be accessed in a similar manner to local file systems, such as by "mounting" a file system within an operating system of an instance 116, reading from and writing to the file system, etc. Such operations may be facilitated by a file system driver within an operating of a client device (e.g., a client computing device 102, an instance 116, etc.). The network file systems 106 may provide for a network-based interface to conduct such operations, such as an interface operating via the Network File System (NFS) protocol. In one embodiment, a network file system 106 is a high speed, parallelized, distributed file system supporting large scale cluster computing, such as the LUSTRE™ file system. Techniques for implementing such a distributed file system are known in the art, and thus will not be described in detail herein. However, in brief, the file system servers 105 may provide for multiple servers operating in parallel to provide for high-speed, parallelized access by multiple client devices to the file systems 106, such as by including a combination of metadata servers (MDSs) storing metadata regarding a file system within metadata targets (MDTs) and object storage servers (OSSs) storing file data within object storage targets (OSTs). In accordance with embodiments of the present disclosure, file system servers 105 may maintain, for each network file system 106, a changelog indicating changes made to the respective file systems 106. For example, the file system servers 105 may utilize changelog functionality provided by the LUSTRE™ file system. Further, the file system servers 105 may be configured to enable execution of additional code managing the network file systems 106. For example, the file system servers 105 may provide for execution of Hierarchical Storage Management (HSM) tools facilitating management of network file systems 106. In accordance with embodiments of the present disclosure, the file system servers 105 may implement an export system to continuously export changes to a file system 106 to target network storage. In one embodiment, the export system may be executed as code within an HSM tool. For example, the export system may be implemented as a daemon within an HSM tool implementation.

In one embodiment, changes to one network file system 106 are replicated via an export tool to another network file system 106. For example, changes made to a LUSTRE™ file system 106 may be replicated to an NFS-protocol file system 106.

In another embodiment, changes to a network file system 106 are replicated to cloud-based object storage, which may be provided by object storage servers 110. The object storage servers 110 represent a distinct type of storage within the cloud provider network 120. The object storage servers 110 and associated control plane functionality can provide an object-based storage service of the cloud provider network. Object-based storage services can be referred to as a blob storage service, cloud object storage service, or cloud storage service, in various implementations. In contrast to block-based storage provided by network file systems 106 (e.g., where devices read and write fixed-length blocks identified by a location, such as a logical block address (LBA)), object storage services 110 facilitate storage of variable-length objects associated with a corresponding object identifier. Each object may represent, for example, a file submitted to the servers 110 by a user for storage (though the servers 110 may or may not store an object as a file). In contrast to block-based storage, where input/output (I/O) operations typically occur via a mass storage protocol, interactions with the object storage servers 110 may occur via a more general network protocol. For example, the servers 110 may facilitate interaction via a Representational State Transfer (REST) application programming interface (API) implemented over the Hypertext Transport Protocol (HTTP). The object storage servers 110 may store objects within resources referred to as buckets 111. Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associated with a unique identifier, such that authorized access to them can be obtained through requests from networked computing devices in any location. Each bucket 111 is associated with a given user account. Users can store as many objects as desired within their buckets, can write, read, and delete objects in their buckets, and can control access to their buckets and the objects contained therein. Further, in embodiments having a number of different object storage servers 110 distributed across different ones of the regions described above, users can choose the region (or regions) where a bucket is stored, for example to optimize for latency. Users can use object storage servers 110 for purposes such as storing photos on social media websites, songs on music streaming websites, or files in online collaboration services, to name a few examples. In accordance with embodiments of the present disclosure, object storage servers 110 may store, as objects, replicas of files on a network file system 106, which replicas may be continuously updated based on changes made to such a file system 106. Applications developed in the cloud often take advantage of the vast scalability and metadata characteristics of the object storage servers 110. The object storage servers 110 can support highly parallel data accesses and transfers. The object storage servers 110 can offer even greater redundancy than the file systems servers 105, as the object storage servers 110 can automatically replicate data into multiple availability zones.

As illustrated in FIG. 1, the cloud provider network 120 can communicate over network 104 with client computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. Client computing devices 102 can include any network-equipped computing device, for example desktop computers, laptops, smartphones, tablets, e-readers, gaming consoles, and the like. Clients can access the cloud provider network 120 via the network 104 to view or manage their data and computing resources, as well as to use websites and/or applications hosted by the cloud provider network 120. While shown as distinct in FIG. 1, elements of the cloud provider network 120 may also act as clients to other elements of that network 120. Thus, a client device 102 can generally refer to any device accessing a network-accessible service as a client of that service.

Figure 2:
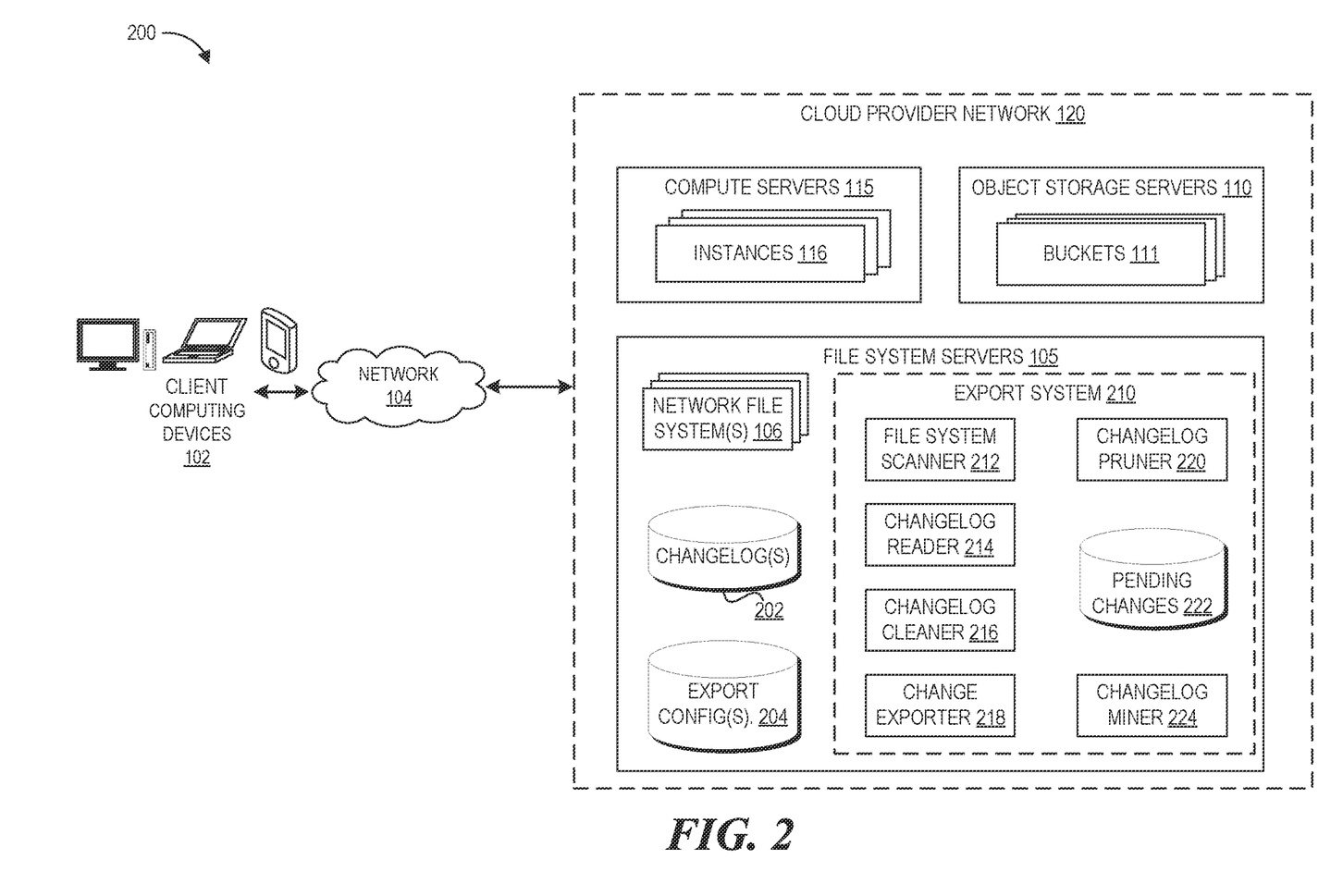
FIG. 2 depicts a schematic diagram of a network environment in which the cloud provider network of FIG. 1 implements an export system facilitating continuous changelog-based replication of changes made to a network file system to a target storage system.

FIG. 2 depicts a computing environment 200 in which a file export system 210 is implemented on the cloud provider network 120. The file export system 210 is illustratively implemented by file system servers 105, though the system 110 may additionally or alternatively be implemented externally to the file system servers 105. As discussed below, the file export system 210 can implement functionalities to provide for replication of changes to network file systems 106 to a target network storage system, such as buckets 111 on the object storage servers 110. For example, a client using a client computing device 102 may interact with the export system 210 to configure replication of changes to a network file system 106 to one or more buckets 111, such as by linking directories within the file system 106 to the buckets 111 and specifying a replication policy defining the types of changes that should be replicated (e.g., creation, modification, or deletion of file system objects, or a combination thereof), types of objects that should be replicated (e.g., files, directories, hard links, symbolic links), filtering criteria for changes or objects (e.g., as a regular expression that matches changes or objects that should or should not be replicated), or a combination thereof. This configuration may be stored within the export configuration data store 204, which represents any persistent or substantially persistent data store.

As discussed above, changes to each network file system 106 may be represented in a changelog provided by the file system 106, such as changelogs 202. In general, each modification to a file system 106 may be represented as a corresponding entry in the changelog 202. For example, a "create directory" operation may be represented as a "create directory" entry in the changelog, specifying the directory created, a "modify file" operation may be represented as a "modify file" operation, specifying the file modified, etc. Accordingly, the export system 210 may monitor the changelogs 202 of a corresponding network file system 106 to detect changes made to that file system 106. In one embodiment, creation and maintenance of the changelogs 202 is a native functionality of a network file system 106, and thus does not negatively impact otherwise normal operation of the file system 106.

To facilitate replication to a target network storage system, the export system 210 includes a number of components shown in FIG. 2, including a changelog reader 214, a changelog pruner 220, a pending changes data store 222, a changelog minor 224, a change exporter 218, and a changelog cleaner 216, each discussed in more detail below with reference to FIG. 3. The export system 210 further includes a file system scanner 212, also discussed in more detail below.

Figure 3:
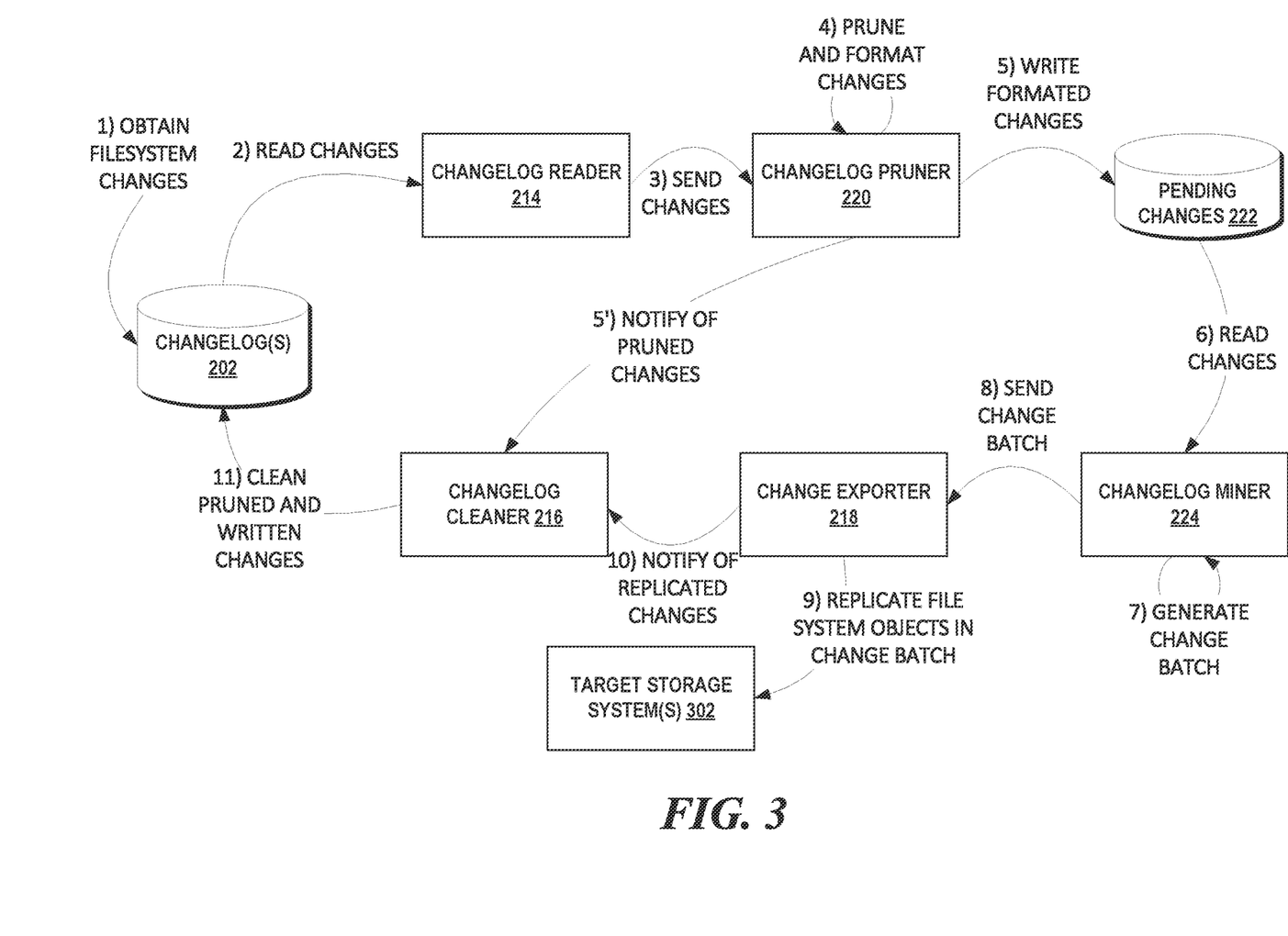
FIG. 3 depicts illustrative interactions on the cloud provider network of FIG. 1 to conduct continuous changelog-based replication of changes made to a network file system to a target storage system.

Specifically, FIG. 3 depicts illustrative interactions for replicating changes made to a file system 106 to one or more target storage system 302. Illustratively, the target storage system 302 may correspond to network accessible file system 106, buckets 111, or other network accessible storage system.

As shown in FIG. 3, the interactions begin at (1), where changes to a file system are recorded within the changelogs 202. For example, changes may be recorded via native operation of the file system.

At (2), the changelog reader 214 reads the changes from the changelogs 202. Illustratively, the changelog reader 214 represents code executed by the export system 210 to read the changelog 202 and detect from entries therein changes to the network file system 106. For example, the changelog reader 214 may be a single-threaded program configured to continuously or periodically read a changelog 202 and detect unprocessed entries therein.

On detecting unprocessed entries within a changelog 202, the changelog reader 214 at (3) sends the entries to the changelog pruner 220, which illustratively represents code executed by the export system 210 to review the unprocessed entries provided by the changelog reader 214 and determine whether such entries correspond to changes that are to be replicated to a target network storage system. Accordingly, at (4), the changelog pruner 222 prunes the changes sent by the changelog reader 214 to remove changes not replicated to the target store systems 302. For example, the changelog pruner 220 may compare each changelog entry to a replication policy within the export configuration data store 204 to determine whether the entry corresponds to a change that is to be replicated. Additionally, at (4), the changelog pruner 22 formats the changes for replication. As discussed above, in some embodiments the target storage system(s) 320 may not natively support operations reflected in the changelogs 202, such as directory creation, modification, or deletion. Accordingly, on detecting unsupported operations 220, the pruner 220 may convert such operations to supported operations of the target storage system 302. For example, the pruner 220 may disregard directory creation operations. As another example, the pruner 220 may convert directory rename or delete operations into corresponding operations for each file stored within the directory. In addition, the pruner 220 may take other actions necessary to translate between file system operations and operations on the target storage system 302. For example, where a target storage system 302 provides for pseudo-directories via file naming convention, a rename operation in a directory "/foo/" of the file "bar.txt" or "baz.txt" may be translated to a rename operation of the "/foo/bar.txt" object to "/foo/baz.txt". In one embodiment, the changelog pruner 220 may be a multithreaded program, with a number of threads determined, for example, by computing resources available to the export system 210, by a number of unprocessed entries passed by the changelog reader 214, or the like.

Thereafter, at (5) and (5'), the changelog pruner 220 can pass changes to the pending changes data store 222 and the changelog cleaner 216, respectively. For example, pruned changes (e.g., those not being replicated to the target storage system 302) can be communicated to the changelog cleaner 216 at (5'), which as discussed below may interact with the changelog 202 to "clean" such changes, for example by deleting entries corresponding to changes or by marking such entries as processed. The remaining entries are, in contrast, written to the pending changes data store 222, at (5).

The pending changes data store 222 may represent any data store, including a persistent or substantially persistent data store or an in-memory data store, configured to store changes that are pending replication to a target network storage system. In one embodiment, the pending change data store 222 stores pending changes as a structured data object divided according to a target network storage system to which the change is to be replicated and according to a file identifier ("fid") indicated as changed via the pending changes. For example, changes may be divided in the data structure first based on a target network storage system to which they are to be replicated. For each target network storage system, changes may be divided according to a file identifier indicated as changed via the pending changes. When multiple changes correspond to the same file identifier, such changes may be linked together, such as via a doubly-linked list. As discussed below, multiple changes made to a given file identifier may be batched together for purposes of replication, to facilitate deduplication of such changes. To facilitate delayed replication, each change stored within the pending changes 222 may be associated with a time indicating when the change was made. Alternatively, only an earliest change corresponding to a given file identifier may be associated with such a time.

To further process changes stored within the pending changes data store 222, the file export system includes a changelog miner 224, which illustratively represents code executed by the export system 210 to review the changes stored in the pending changes data store 222 and batch such changes together for replication to a corresponding target network storage system. For example, the changelog miner 224 may be a single-threaded program configured to continuously or periodically read from the pending changes data store 222 and detect whether an earliest change to any file identifier satisfies a delay threshold (as indicated, for example, in the export configuration data store 204).

Accordingly, at (6), the changelog minor 224 reads changes from the pending changes data store 222 and, at (7), generates a batch of changes to be replicated to the target storage system 302. Illustratively, the changelog miner 224 may operate to generate batches on the basis of file identifiers, such that when an earliest change corresponding to a given file identifier is included within a batch (e.g., based on a time of that earliest change satisfying a threshold time period), all changes for that file identifier (as reflected in the pending changes data store 222) are included within the batch. Further, the changelog miner 224 may generate batches on a "first-in, first-out" basis, such that each batch contains no more than a threshold maximum number of changes, a threshold maximum number of file identifiers, or a combination thereof, which threshold may be referred to as a batch size threshold. Accordingly, the changelog miner 224 illustratively scans the pending changes data store 222, determines a set of changed file identifiers with an earliest change time that satisfies a threshold delay, and generates a batch on a first-in, first-out basis to satisfy the batch size threshold.

Thereafter, at (8), the changelog miner 224 transmits the batch of changes to the change exporter 218, which illustratively represents code executed by the export system 210 to export files (or metadata regarding such files) from a file system 106 based on changes included within the change batch. For example, the change exporter 218 may be a multi-threaded program with a thread created, for example, based on each batch of changes sent by the changelog miner 224.

At (9), the change exporter 218 replicates changes to the file system 106 to the target storage system 302. More specifically, the change exporter 218 replicates file system objects reflected in the change batch from the file system 106 to the target storage system 302 in order to replicate changes made to the file system 106. In cases where a change reflected within a change batch is to data of a file, the change exporter 218 can read the file within the file system 106 and write the file to the target storage system 302. In cases where a change reflected within a change batch is a change to metadata of the file (e.g., a rename), the change exporter 218 can request corresponding modification of metadata of the file (or corresponding data object) on the target storage system 302, or conduct a corresponding operation on the target storage system 302 to effect metadata modification (e.g., by creating a copy of an existing object on the target storage system, representing the file prior to the rename operation, and naming the copy in accordance with the rename operation). In some embodiments, the change exporter 218 may deduplicate changes prior to replication. For example, where the change batch reflects multiple changes to a file's metadata, the exporter 218 may conduct a single replicate operation using the most recent metadata for the file on the file system 106. Similarly, where the change batch reflects multiple changes to a file's data, the exporter 218 may conduct a single replicate operation using the most recent data for the file on the file system 106. In other embodiments, such deduplication may occur at other points within the export system 210, such as by deduplicating overlapping changes at the changelog miner 224 or within the pending changes data store 222.

Subsequent to replicating the changes to the target storage system 302, the change exporter 218, at (10), notifies the changelog cleaner 216 of the replicated changes. As noted above, the changelog cleaner 216 may function to modify the changelog 202 to note specific entries within the log 202 as having been processed. For example, the changelog cleaner 216 can represent a single-threaded program executed by the export system 210 to periodically modify the changelog 202 in accordance with processing notifications by the changelog pruner 220 or change exporter 218. Accordingly, at (11), the changelog cleaner 216 modifies the changelogs 202 to reflect successful processing of the pruned changes and changes within a change batch. For example, the cleaner 216 may delete entries corresponding to such changes, or otherwise modify the entries to denote successful processing. In one embodiment, the interactions of FIG. 3 occur continuously, such that the changelog reader 214 can thereafter inspect the changelogs 202 to detect new, not yet processed file system changes (e.g., inserted into the changelogs 202 on additional instances of interaction (1)). The interactions of FIG. 3 can then proceed at (2), as noted above, and occur continuously for example during operation of the export system 210.

While FIG. 3 depicts one example set of interactions, others are possible. For example, in some instances it may be difficult or require significant computing resources to remove changelog entries only after replication of those changes to a target storage system. Accordingly, in some embodiments a changelog pruner 220 may be configured to notify the changelog cleaner 216 at (5') of all received changes, as opposed to pruned changes, and the cleaner 216 in turn may remove such changes from the changelogs 202. As these changes may be removed based on interaction (5'), interaction (10) may be unnecessary and therefore may be omitted in such embodiments. Illustratively, this immediate removal of changes may reduce total memory required on the export system 210 to, for example, maintain status information for changes pending replication. For example, where a given changelog entry is translated to multiple operations on a target storage system (such as a directory rename being translated to file rename operations for each file within a directory), immediate removal of the changelog entry, as opposed to removal after each translated operation completes, may remove a need to maintain information mapping such translated operations to the initial changelog entry. As discussed below, in some embodiments the pending changes data store 222 may be stored at least partially in non-volatile memory to ensure resiliency of operation in the case of temporary failure of the export system 210, as such changes may otherwise be overlooked as already processed based on being removed or marked within the changelog 202.

While FIG. 3 generally describes interactions for continuous replication of changes, embodiments of the present disclosure may additionally replicate changes in a periodic or on-demand manner. For example, continuous changelog-based replication may be inappropriate for replicating an initial state of a file system 106 to a target storage system 302. Accordingly, in addition to continuous changelog-based replication, the export system 210 can implement periodic or on-demand replication via file system scanner 212, which illustratively represents code executable to scan the network file system 106 and replicate the files on the system 106 to the target storage system 302 (e.g., to one or more buckets 111, to another network file system 106, etc.). In some embodiments, the file system scanner 212 may replicate files without reference to a current state of the target storage system 302, such as by replicating each file of the file system 106 regardless of whether such file current exists on the file system 106. Illustratively, such replication may operate according to a "copy if different" mechanism, whereby the target file system 302 is configured to compare a file being passed by the export system 210 and to store (or potentially to receive) the file only if the file is not already stored on the export system 210. In other embodiments, the file system scanner 212 inspects the target storage system 302 prior to replication, such that files are replicated only if not already stored on the target storage system 302. To facilitate replication, the file system scanner 212 may utilize other components of the export system 210 discussed above. For example, the file system scanner 212 may replicate files by interaction with the changelog pruner 220, such as by fabricating changelog entries (as if a file to be replicated was recently created or changed, for example) and passing them to the changelog pruner 220 for processing in the manner described above with reference to FIG. 3. Thus, the interactions of FIG. 3 may be modified to facilitate periodic or on-demand replication via the file system scanner 212.

In some embodiments, the file system scanner 212 may be used to provide resiliency to the export system 210. For example, where the pending changes data store 222 is maintained in volatile memory such as RAM, a failure of the export system 210 may cause a loss of pending and not-yet replicated changes. One mechanism for addressing such failures may be to store the pending changes data store 222 in non-volatile storage; however, this mechanism may require additional computing resources or otherwise slow operation of the export system 210. In some embodiments, the file system scanner 212 may be used to recapture changes that might otherwise be lost on failure of the system 210. For example, file data changes may be stored in volatile memory and effectively recovered via operation of the file system scanner 212 should the export system 210 fail (e.g., because such changes would be apparent to the scanner 212 via scanning of the network file system 106). In contrast, changes that may not be apparent to the scanner 212, such as deletions and renaming operations, may be stored within non-volatile memory. Accordingly, in some such embodiments, the pending changes data store 222 may correspond to a combination of volatile and non-volatile memory, with each change being stored in such volatile or non-volatile memory according to, for example, whether the change would be detected by the file system scanner 212 subsequent to a failure of the export system 210.

Figure 4:
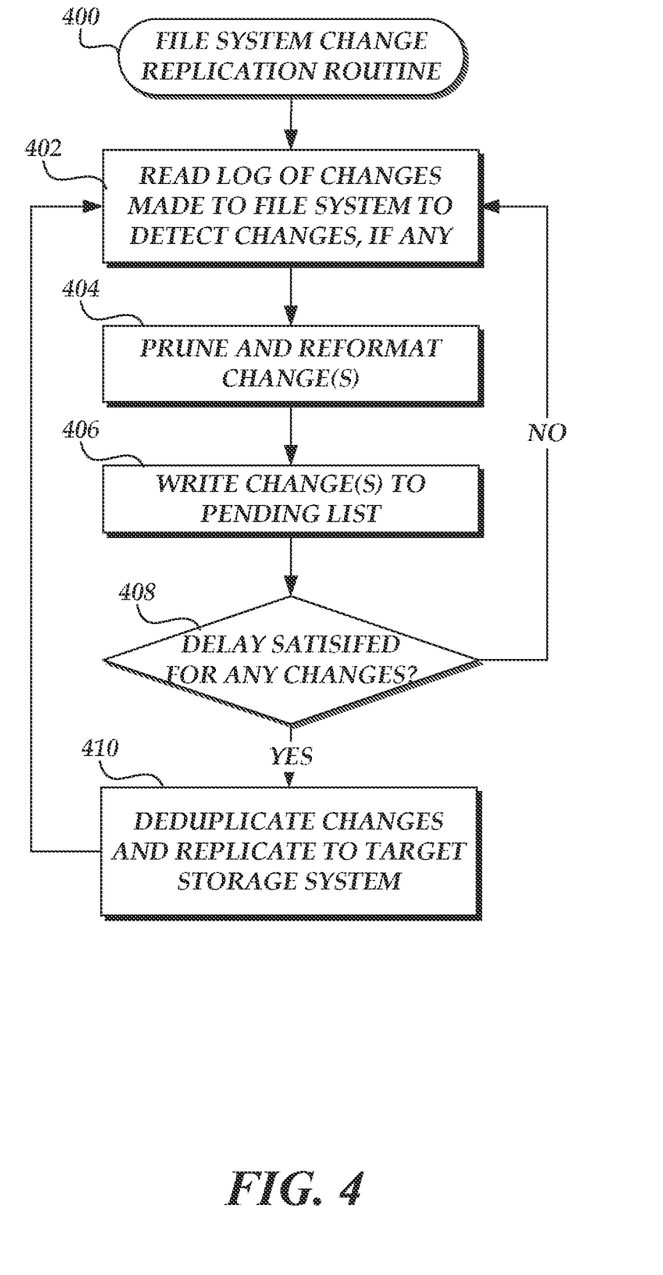
FIG. 4 depicts an illustrative routine implemented on the cloud provider network of FIG. 1 to conduct continuous changelog-based replication of changes made to a network file system to a target storage system.

With reference to FIG. 4, an illustrative routine 400 will be described for replicating changes to a file system, such as a network file system 106, to a target storage system, such as a bucket 111 or another network file system 106. The routine 400 may be carried out, for example, by the export system 210 of FIG. 2.

The routine 400 begins at block 402, where the export system 210 reads a log of changes made to a file system to detect changes, if any. Illustratively, the export system 210 may read a changelog provided by the file system to detect such changes. As discussed above, each entry in such a changelog may illustratively reflect a file changed on the file system, and what type of change was made (e.g., creation, deletion, data or metadata modification, etc.).

At block 404, the export system 210 prunes and reformats changes as necessary for replication to a target storage system. For example, the export system 210 may compare each entry within the changelog to determine whether the entry matches a replication policy for the file system, and if so, a particular target storage system to which to replicate the change. Illustratively, the export system 210 may detect that the change is within a given directory (e.g., "/fool") associated with a policy that replicates to a given target storage system changes that create of new files or modify of existing files, but not changes reflecting deletions. Thus, the export system 210 may determine whether the change corresponds to creation of a new file or modification of an existing file, and if so, maintain the change. If the change corresponds to deletion of a file, the export system 210 may prune the change as not matching the replication policy. Comparison of a change with a replication policy may include other comparisons, such as a comparison of an attribute of the file (e.g., a name) to policy filter criteria (e.g., a regular expression) to determine whether the change matches the policy. In addition, the export system 210 may reformat the change as necessary to facilitate duplication. For example, where the target storage system does not directly support directories, the export system 210 may modify changes accordingly, such as by replacing file names with a combination of file and directory names, converting changes to a directory object to corresponding file object changes, etc.

At block 406, the export system 210 writes the remaining changes to a list of changes pending replication, such as the pending changes data store 222. As noted above, the changes are illustratively stored within the data store 222 in a manner that facilitates later grouping of changes for replication purposes. For example, changes may be grouped by a target storage system to which they are replicated, a file identifier, or a combination thereof.

At block 408, the export system 210 determines whether any changes within the list of changes pending replication have satisfied a delay threshold. As discussed above, this threshold may be set to reduce a total volume of data transmitted to a target storage system and reduce computational resource usage of the export system 210, for example by enabling multiple changes to a given file to be grouped together and deduplicated. The delay threshold may illustratively be set by an operator of a file system from which changes are being replicated, according to (for example) write patterns to the file system. If no change within the list of changes pending replication satisfies the delay threshold, the routine 400 returns to block 402, where additional changes are read and processed as noted above.

If a change within the list of changes pending replication satisfies the threshold at block 408, the routine 400 proceeds to block 410, where the export system deduplicates the changes and replicates the deduplicated changes to a target storage system. In one embodiment, the export system 210 conducts deduplication on the basis of file identifier and change type. For example, the export system 210 may be configured to replicate changes according to a granularity that varies by the type of change. Illustratively, data changes may be replicated by replicating the file's data as a whole, while metadata changes may be replicated by individual metadata field. Accordingly, where the list of changes pending replication includes multiple changes to the same replicated information (e.g., multiple changes to the file's data, multiple changes to the same metadata field, etc.), the export system 210 may replicate only a latest-in-time change to that replicated information. As discussed above, such changes may be replicated for example by reading current information regarding a file, such as the file's data or metadata, and replicating that file to the target storage system, such as by calling an application programming interface (API) of the target storage system or otherwise interfacing with the target storage system. Accordingly, the changes to the file system may be replicated to the target storage system, increasing resiliency and accessibility of the data.

The routine 400 then returns to block 402, as discussed above. The routine 400 may illustratively operate continuously during operation of the file system, thus facilitating continuous replication of changes to the file system. While the routine 400 is shown in FIG. 4 as a single process for ease of explanation, in practice the routine 400 may be implemented as multiple processes implemented at least partly concurrently. For example, each block of the routine 400 may be implemented as one or more separate processes executing independently of one another.

While embodiments are described herein with reference to network file systems, these embodiments may be modified to additionally or alternatively replicate changes to non-network file systems, such as a local file system of an instance 116 or a local file system of a client computing device 102. In some embodiments, changes to such a file system may be replicated to another local file system. Thus, discussion of networked file systems is intended to be illustrative in nature.

Figure 5:
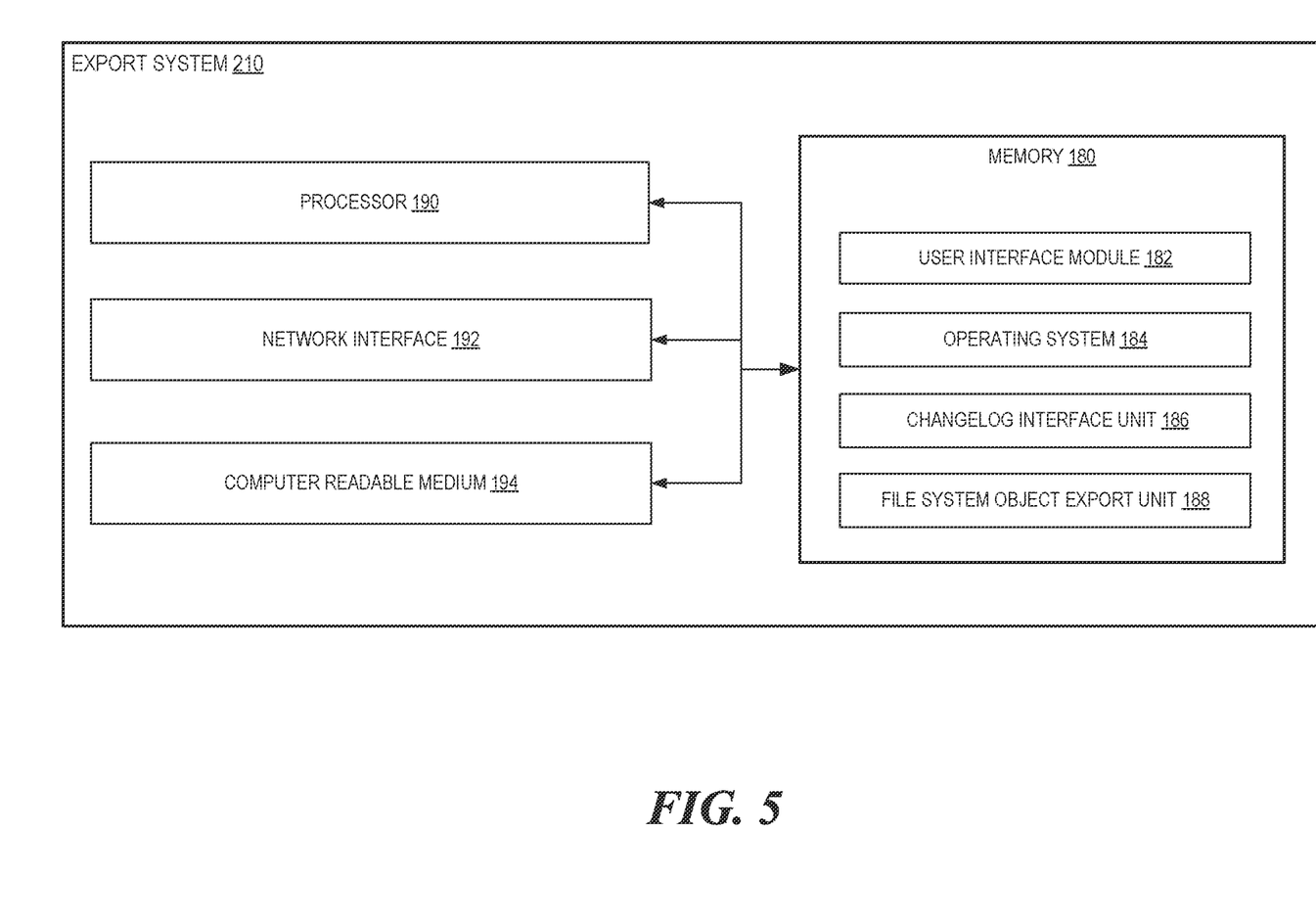
FIG. 5 depicts a general architecture of a computing device or system providing continuous changelog-based replication in accordance with aspects of the present disclosure.

FIG. 5 depicts an example architecture of a computing system (referred to as the export system 210) that can be used to perform one or more of the techniques described herein or illustrated in FIGS. 1-4. The general architecture of the export system 210 depicted in FIG. 5 includes an arrangement of computer hardware and software modules that may be used to implement one or more aspects of the present disclosure. The export system 210 may include many more (or fewer) elements than those shown in FIG. 5. It is not necessary, however, that all of these elements be shown in order to provide an enabling disclosure. As illustrated, the export system 210 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIGS. 1 and 2.

The processor 190 may also communicate with memory 180. The memory 180 may contain computer program instructions (grouped as modules or units in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of the export system 210. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device.

In addition to and/or in combination with the user interface module 182, the memory 180 may include a changelog interface unit 186 and system object export unit 188. In one embodiment, the changelog interface unit 186 and system object export unit 188 when executed implements various aspects of the present disclosure, e.g., replicating file system changes to a target storage system, and/or other aspects discussed herein or illustrated in FIGS. 1-4. Illustratively, the changelog interface unit 186 may include code corresponding to the changelog reader 214, changelog pruner 220, and changelog cleaner 216. The system object export unit 188 may contain code corresponding to the changelog miner 224 and change exporter 218.

While the changelog interface unit 186 and file system object export unit 188 are shown in FIG. 5 as part of the export system 210, in other embodiments, all or a portion of the recovery changelog interface unit 186 and file system object export unit 188 may be implemented by other components of the cloud provider network 120 and/or another computing device. For example, in certain embodiments of the present disclosure, another computing device in communication with the cloud provider network 120 may include several modules or components that operate similarly to the modules and components illustrated as part of the export system 210. In some instances, the changelog interface unit 186 and file system object export unit 188 may be implemented as one or more virtualized devices, such as one or more instances 116 on the compute servers 115. Moreover, as noted above, the changelog interface unit 186 and file system object export unit 188 may be implemented in whole or part as a distributed computing system including a collection of devices that collectively implement the functions discussed herein.

While FIG. 5 is depicted as the export system 210, a similar device may be used to implement other elements of FIGS. 1-2. For example, a device having a similar configuration when programmed with appropriate modules may be used to implement compute servers 115, file system servers 105, or object storage servers 110.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

The invention claimed is:

1. A system for conducting continuous changelog-based replication of modifications made to a network file system to a target storage system, the system comprising:

one or more computing devices hosting the network file system, wherein one or more computing devices are configured to enable modifications to the network file system by client computing devices, and wherein the one or more computing devices are configured to store a record of the modifications to the network file system to a changelog associated with the network file system; and one or more computing devices hosting an object storage system;

wherein the one or more computing devices hosting the network file system are further configured to:

obtain configuration information identifying the object storage system as the target storage system to which to replicate modifications made to the network file system;

monitor the changelog to detect the modifications of the network file system;

filter the modifications according to filtering criteria within the configuration information to result in a set of modifications pending replication, wherein individual modifications within the set of modifications pending replication represent modifications to individual files stored within the network file system;

for an individual file of the individual files, determine whether an individual modification, within the set of modifications and indicated within the changelog, that modified the individual file satisfies a delay threshold, wherein the delay threshold represents a time required to have elapsed since the individual modification, as indicated within the changelog, was made to the individual file; and in response to determining that the individual modification indicated within the changelog satisfies the delay threshold, for the individual file of the individual files, identify a batch of modifications comprising the individual modification and at least one subsequent modification, as indicated within the changelog, made to the individual file stored within the network file system, wherein the at least one subsequent modification does not satisfy the delay threshold; and in response to determining that the individual modification indicated within the changelog satisfies the delay threshold, replicate to the object storage system the batch of modifications, within the set of modifications made to the network file system indicated within the changelog, that modified the individual file, including the individual modification that satisfies the delay threshold and the at least one subsequent modification that does not satisfy the delay threshold.

2. The system of claim 1, wherein the network file system is a distributed, parallelized, cluster file system.

3. The system of claim 1, wherein at least one modification, within the set of modifications, modified data within the individual file, and wherein replicating to the object storage system each modification, within the set of modifications, that modified the individual file comprises copying the individual file to the object storage system.

4. The system of claim 1, wherein at least one modification, within the set of modifications, modified metadata within the individual file, and wherein replicating to the object storage system each modification, within the set of modifications, that modified the individual file comprises modifying metadata of a copy of the individual file stored on the object storage system.

5. A computer-implemented method comprising:

monitoring a changelog associated with a network file system to detect modifications made to the network file system, wherein individual modifications, as represented within the changelog, represent modifications made to individual files stored within the network file system;

for an individual file of the individual files, determining whether an individual modification, within the modifications made to the network file system and indicated within the changelog, that modified the individual file satisfies a delay threshold, wherein the delay threshold represents a required time to have elapsed since the individual modification, as indicated within the changelog, was made to the individual file;

in response to determining that the individual modification indicated within the changelog satisfies the delay threshold, for the individual file of the individual files, identifying a batch of modifications comprising the individual modification and at least one subsequent modification, as indicated within the changelog, made to the individual file stored within the network file system, wherein the at least one subsequent modification does not satisfy the delay threshold; and in response to determining that the individual modification indicated within the changelog satisfies the delay threshold, replicating to a target network storage system the batch of modifications, within the modifications made to the network file system indicated within the changelog, that modified the individual file, including the individual modification that satisfies the delay threshold and the at least one subsequent modification that does not satisfy the delay threshold.

6. The computer-implemented method of claim 5, wherein monitoring the changelog associated with the network file system to detect the modifications made to the network file system comprises:

monitoring the changelog associated with the network file system to identify an unfiltered set of modifications made to the network file system; and applying filtering criteria to the unfiltered set of modifications to detect the modifications.

7. The computer-implemented method of claim 6, wherein the filtering criteria specifies one or more of types of changes that should be replicated or types of file system objects that should be replicated.

8. The computer-implemented method of claim 5 further comprising determining that modifications, as represented within the changelog, made to multiple files satisfy the delay threshold, wherein replicating to the target network storage system each modification, within the modifications made to the network file system, that modified the individual file comprises replicating to the target network storage system each modification, within the modifications made to the network file system, that modified any of the multiple files.

9. The computer-implemented method of claim 5 further comprising storing the modifications made to the network file system within a data structure, the data structure partitioning the modifications made to the network file system according to which file is modified by a respective modification.

10. The computer-implemented method of claim 9, wherein the target network storage system comprises multiple target network storage systems, and wherein the data structure further partitions the modifications made to the network file system according to which target network storage system, of the multiple target network storage systems, a respective modification is to be replicated to.

11. The computer-implemented method of claim 5 further comprising modifying the changelog to mark the individual modification made to the network file system as having been replicated.

12. The computer-implemented method of claim 5 further comprising:
scanning the network file system to detect modifications made to the network file system that have not yet been replicated to the target network storage system; and
replicating to the target network storage system the modifications made to the network file system that have not yet been replicated to the target network storage system.

13. One or more non-transitory computer-readable media comprising computer-executable instructions that, when executed by a computing system, cause the computing system to:
monitor a changelog associated with a network file system to detect modifications made to the network file system, wherein individual modifications, as represented within the changelog, represent modifications made to individual file system objects of the network file system;
for an individual file system object of the individual file system objects, determine whether an individual modification, within the modifications made to the network file system and indicated within the changelog, that modified the individual file system object satisfies a delay threshold, wherein the delay threshold represents a required time to have elapsed since the individual modification, as indicated within the changelog, was made to the individual file system object; and
in response to determining that the individual modification indicated within the changelog satisfies the delay threshold, for the individual file system object of the individual file system objects, identifying a batch of modifications comprising the individual modification and at least one subsequent modification, as indicated within the changelog, made to the individual file system object stored within the network file system, wherein the at least one subsequent modification does not satisfy the delay threshold; and
in response to determining that the individual modification indicated within the changelog satisfies the delay threshold, replicating to a target storage system the batch of modifications, within the modifications made to the network file system indicated within the changelog, that modified the individual file system object, including the individual modification that satisfies the delay threshold and the at least one subsequent modification that does not satisfy the delay threshold.

14. The one or more non-transitory computer-readable media of claim 13, wherein the individual file system objects comprise one or more of files, hard links, symbolic links, or directories.

15. The one or more non-transitory computer-readable media of claim 13, wherein the individual modification that modified the individual file system object is a directory rename operation applied to a directory, wherein the target storage system lacks support for directories, and wherein replicating to the target storage system the directory rename operation comprises:
translating the directory rename operation into one or more file rename operations corresponding to files stored within the directory; and
conducting the one or more file rename operations on the target storage system.

16. The one or more non-transitory computer-readable media of claim 13, wherein the individual modification that modified the individual file system object is a directory deletion operation applied to a directory, wherein the target storage system lacks support for directories, and wherein replicating to the target storage system the directory deletion operation comprises:
translating the directory deletion operation into one or more file deletion operations corresponding to files stored within the directory prior to deletion; and
conducting the one or more file deletion operations on the target storage system.

17. The one or more non-transitory computer-readable media of claim 13, wherein to monitor the changelog associated with the network file system to detect the modifications made to the network file system, and wherein the instructions cause the computing system to:
monitor the changelog associated with the network file system to identify an unfiltered set of modifications made to the network file system; and
apply filtering criteria to the unfiltered set of modifications to detect the modifications.

18. The one or more non-transitory computer-readable media of claim 13, wherein the instructions further cause the computing system to store the modifications made to the file system within a data structure, the data structure partitioning the modifications made to the file system according to which file is modified by a respective modification.

19. The one or more non-transitory computer-readable media of claim 13, wherein the instructions further cause the computing system to modify the changelog to mark the modifications made to the file system as having been replicated.

20. The one or more non-transitory computer-readable media of claim 13, wherein the instructions further cause the computing system to:
scan the file system to detect modifications made to the file system that have not yet been replicated to the target storage system; and
replicating to the target storage system the modifications made to the file system that have not yet been replicated to the target storage system.

* * * * *